US006904696B2

(12) United States Patent
Böge et al.

(10) Patent No.: US 6,904,696 B2
(45) Date of Patent: Jun. 14, 2005

(54) METHOD AND DEVICE FOR ATTACHING A SCALE ELEMENT

(75) Inventors: Ludwig Böge, Jenapriessnitz (DE); Reiner Burgschat, Jena (DE); Wolfgang Sachse, Jena (DE)

(73) Assignee: Dr. Johannes Heidenhain GmbH, Traunreat (DE)

( * ) Notice: Subject to any disclaimer, the term of this patent is extended or adjusted under 35 U.S.C. 154(b) by 0 days.

(21) Appl. No.: 10/612,720

(22) Filed: Jul. 2, 2003

(65) Prior Publication Data

US 2004/0101341 A1 May 27, 2004

(30) Foreign Application Priority Data

Jul. 3, 2002 (DE) .......................... 102 29 885

(51) Int. Cl.$^7$ .............................. A45B 3/08; G01B 7/02
(52) U.S. Cl. .............................. 33/706; 33/707; 33/708
(58) Field of Search .......................... 33/706–708, 645, 33/758, 483–485, 489

(56) References Cited

U.S. PATENT DOCUMENTS

| | | | | |
|---|---|---|---|---|
| 3,696,667 A | * | 10/1972 | Foster et al. ............. | 73/862.42 |
| 4,170,826 A | * | 10/1979 | Holstein ...................... | 33/702 |
| 4,198,757 A | * | 4/1980 | Nelle et al. .................... | 33/706 |
| 4,320,578 A | * | 3/1982 | Ernst ............................ | 33/702 |
| 4,479,304 A | * | 10/1984 | Nelle ........................... | 33/700 |
| 4,541,181 A | * | 9/1985 | Giacomello .................. | 33/707 |
| 4,559,707 A | * | 12/1985 | Oberhans ..................... | 33/702 |
| 5,063,685 A | | 11/1991 | Morrison et al. | |
| 5,842,283 A | * | 12/1998 | Yatsu et al. ................... | 33/706 |
| 6,049,992 A | | 4/2000 | Freitag et al. | |
| 6,163,970 A | * | 12/2000 | Nelle et al. .................... | 33/482 |
| 6,178,656 B1 | * | 1/2001 | Jung ............................ | 33/706 |
| 6,442,861 B1 | * | 9/2002 | Boge et al. .................... | 33/706 |
| 6,523,268 B1 | * | 2/2003 | Boge ........................... | 33/1 PT |
| 6,571,486 B1 | * | 6/2003 | Tondorf et al. ............... | 33/706 |
| 6,701,634 B2 | * | 3/2004 | McMurtry et al. ............ | 33/706 |

FOREIGN PATENT DOCUMENTS

| | | |
|---|---|---|
| DE | 197 00 367 C2 | 7/1999 |
| EP | 0 388 453 B1 | 6/1993 |

OTHER PUBLICATIONS

Heidenhain Company Brochure entitled "NC–Längenmeßsysteme" (NC Linear Measuring System), published by Heidenhain, Sep., 1998, pp. 58–59.

* cited by examiner

Primary Examiner—Christopher W. Fulton
Assistant Examiner—Yaritza Guadalupe
(74) Attorney, Agent, or Firm—Brinks Hofer Gilson & Lione

(57) ABSTRACT

A method for the directional attachment of a scale element of a position measuring system to an installation face of a first body. The method includes aligning a scale element on an installation face of a first body parallel to a measuring direction via an adjustment device provided on a second body, which has a scanning head provided thereon and is movable in the measuring direction in relation to the first body. Attaching the aligned scale element to the installation face, wherein the adjustment device is in an alignment position with respect to the second body during the attaching. Positioning the adjustment device into a position of rest with respect to the second body subsequent to the attaching, wherein the position of rest is different from the alignment position.

15 Claims, 3 Drawing Sheets

METHOD AND DEVICE FOR ATTACHING A SCALE ELEMENT

Applicants claim, under 35 U.S.C. §119, the benefit of priority of the filing date of Jul. 3, 2002 of a German patent application, copy attached, Ser. No. 102 29 885.8, filed on the aforementioned date, the entire contents of which is incorporated herein by reference.

BACKGROUND OF THE INVENTION

1. Field of the Invention

The present invention relates to a method for the directional attachment of a scale element, such as a scale or a scale support or a scale guide device of a position measuring system to an installation face of a first body. The present invention further relates to a device for executing the method.

2. Discussion of Related Art

Such scales can be attached to machine tools or coordinate-measuring machines. The machines have at least two elements, which can be moved with respect to each other. The scale is affixed on one of the two elements and is then used, together with a scanning head located at the other of the two elements, for measuring the relative movement of the two elements.

Often, very long scales are needed for such position measurements at machine tools or coordinate-measuring machines. The scales must be fastened, aligned parallel with the measuring direction, wherein the measuring direction is predetermined by the guide devices of the machine tool or measuring machine.

Various steps have already been proposed for the attachment of scales.

In accordance with EP 0 388 453 B1, a self-adhesive tape scale is glued on by an adjustment device and is aligned in the direction of the guide sequence of a carriage of a machine tool or measuring machine. This type of fastening offers a good allocation of the tape scale to the scanning head, but can only be employed for highly elastic scales in tape form. The adjustment device is always attached to the carriage in place of the scanning head, so that the scanning head must be removed for aligning the tape scale, the adjustment device must be attached, then removed again after alignment, and the scanning head must be attached again. As a whole, this is very cumbersome.

It is alternatively possible, such as described in DE 197 00 367 A1, to provide lateral contact elements for aligning a scale, against which the measuring tape is placed.

An also widely used fastening method for thin scales consists in introducing the scale into a groove of a scale support. This is described on pages 58 and 59 of the company publication "NC Längenmeβsysteme" [NC Linear Measuring Systems] of the firm Dr. Johannes Heidenhain GmbH of September 1998. In this case, scale supports made of extruded aluminum are affixed to a fastening surface with an adhesive tape with glue on both sides, and thereafter a scale is pushed into the receiving groove of the profile. Here, too, the problem of aligning the scale support exactly parallel with the measuring direction also exists.

Alternatively there is the option of initially attaching a scale guide device aligned with the installation face, on which it is then possible in turn to align the scale itself.

Adjusting devices are always provided in connection with the attachment methods for scales, scale guide devices and scale supports so far known, which ate attached for this purpose to the machine tool or coordinate-measuring machine, and then must be removed again from the machine after the scale or the scale support have been attached.

OBJECT AND SUMMARY OF THE INVENTION

An object of the present invention is based on providing a less cumbersome method and a corresponding device, by which scales, scale supports or scale guide devices can be aligned in a simple manner with respect to a body.

This object is attained on the one hand by a method for the directional attachment of a scale element of a position measuring system to an installation face of a first body. The method includes aligning a scale element on an installation face of a first body parallel to a measuring direction via an adjustment device provided on a second body, which has a scanning head provided thereon and is movable in the measuring direction in relation to the first body. Attaching the aligned scale element to the installation face, wherein the adjustment device is in an alignment position with respect to the second body during the attaching. Positioning the adjustment device into a position of rest with respect to the second body subsequent to the attaching, wherein the position of rest is different from the alignment position.

With this method for the directional attachment of a scale element, such as a scale or a scale support or a scale guide device of a position measuring system to an installation face of a first body, a scale or a scale support or a scale guide device is aligned on the installation face parallel with a measuring direction by an adjustment device provided on a second body, which is movable in this measuring direction in relation to the first body. The second body has a scanning head. In the course of attaching the scale or the scale support or the scale guide device, the adjustment device is in an alignment position in relation to the second body. Following the attachment of the scale or the scale support or the scale guide device, the adjustment device is placed into a rest position with respect to the second body, which is different from the alignment position.

Thus, in accordance with the present invention the scanning head and the adjustment device are attached to the machine at the same time during the alignment of the: scale. It is not necessary to remove the scanning head for aligning the scale.

In an advantageous further development, in the position of rest the adjustment device remains on the second body.

This has the substantial advantage that the adjustment device can remain on the machine during the entire service life of the machine tool or coordinate measuring machine, in particular also during the measuring process, and only needs to be placed into the position of rest during measuring operations. Accordingly, the adjustment device can be provided on the machine tool or the coordinate-measuring machine already at the factory, for example, and need not be specially attached to the machine for aligning the scale or the scale support, nor removed again after the alignment.

The adjustment device can have at least one adjusting leg which is displaced closer toward the first body in the alignment position than in the position of rest. In this case the adjustment device can be prestressed in one of the two positions, which can be provided by spring elements, for example.

Finally, the adjustment device can be provided on the scanning head, which is a part of the second body. In contrast to conventional methods, wherein the adjustment device can only be attached to the machine in place of the scanning head, in accordance with the present invention the scanning head and the adjustment device integrated into it always remain on the machine.

The object is furthermore attained by a device for the directional attachment of a scale element of a position measuring system to an installation face of a first body. An adjustment device, which is provided on a second body that includes a scanning head, which is movable in a measuring direction in relation to a first body that includes an installation face, by which a scale element is aligned on the installation face parallel with respect to the measuring direction. The adjustment device is brought into an alignment position for aligning the scale element and, following attachment of the scale element, is moved into a position of rest with respect to the second body, which is different from the alignment position.

In connection with this device for the directional attachment of a scale or a scale support or a scale guide device of a position measuring system to an installation face of a first body, an adjustment device is provided on a second body, which can be moved in a measuring direction with respect to a first body. The scale, or the scale support, or the scale guide device can be aligned parallel in relation to this measuring device on the installation face by this adjustment device. The second body has a scanning head. The adjustment device is seated on this second body in such a way that, for aligning the scale or the scale support of the scale guide device, it can be moved into an alignment position and, following the attachment of the scale or the scale support, can be moved into a position of rest in relation to the second body which differs from the alignment position.

The adjustment device can be integrated into the second body and can remain thereon also in the position of rest.

The adjustment device can have at least one adjusting leg for aligning the scale or the scale support or the scale guide device, which can be moved in relation to the second body. It can furthermore have at least one spring, which prestresses the adjustment device, in particular the at least one adjusting leg, in the direction of one of the two positions.

In an advantageous further development, two adjusting legs are provided, wherein one of the adjusting legs is attached to the other, and the two adjusting legs are seated so they are movable with respect to each other and with respect to the second body. This embodiment is particularly suited for the alignment of a scale guide device with two guide strips, which are guided by at least one of the adjustment legs during the alignment.

The adjustment device can be provided in particular on the scanning head, which is a part of the second body. In this case, in the position of rest it should not substantially increase the dimensions of the scanning head. The relatively small dimensions of the scanning head (for example 13.2× 12.4 mm in cross section) are not exceeded after the application of the scale, when the adjustment device has been put into the position of rest.

The present invention will be explained in greater detail in what follows by the drawings.

DETAILED DESCRIPTION OF THE PREFERRED EMBODIMENTS

A preferred embodiment of the device in accordance with the present invention will now be described in greater detail, making reference to the drawings.

Figure 1:
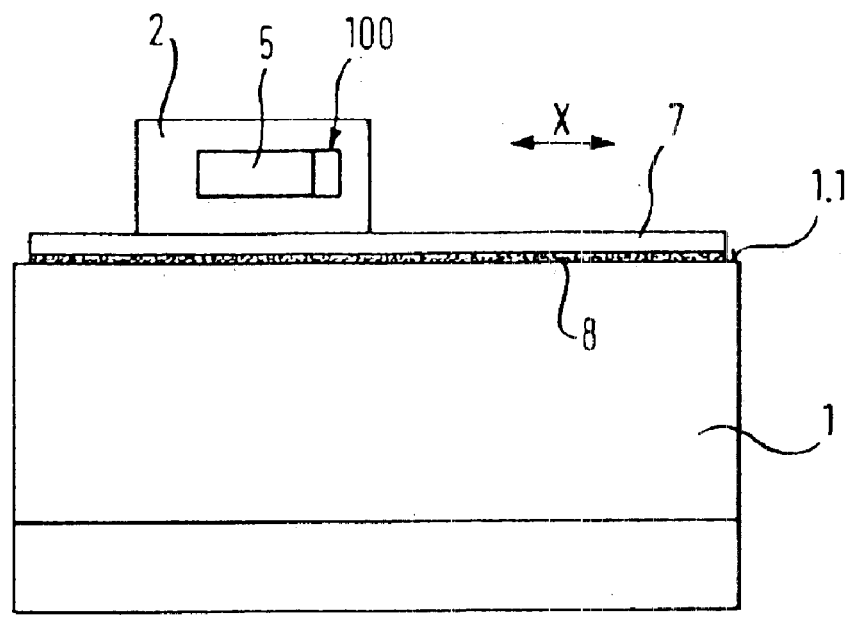
FIG. 1 is a lateral view of a coordinate-measuring machine with a first embodiment of an adjustment device in accordance with the present invention.
Figure 2:
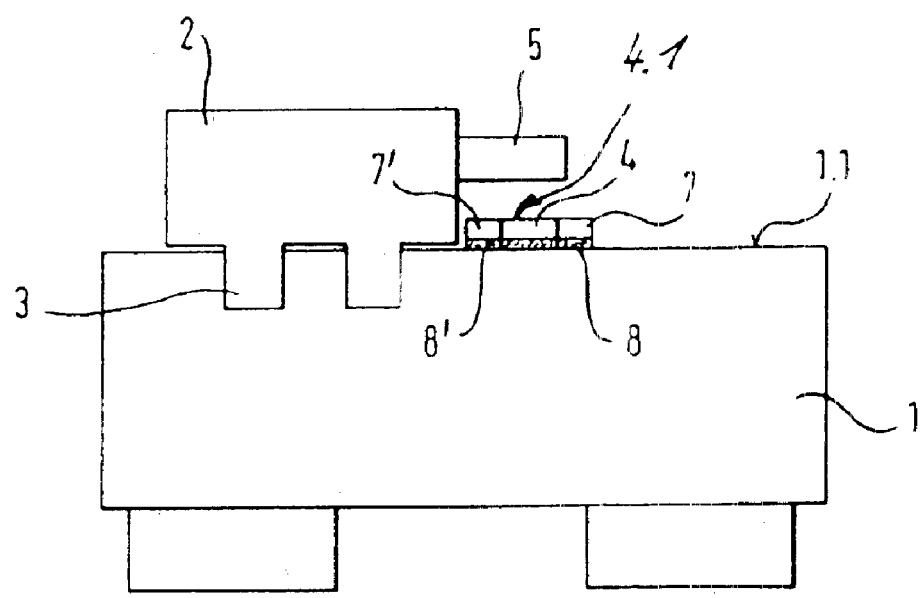
FIG. 2 is a front view of the coordinate-measuring machine of FIG. 1 in accordance with the present invention.

A coordinate-measuring machine, having a machine base 1 and a carriage 2, is represented in FIGS. 1 and 2. The carriage 2 can be displaced in a longitudinal direction X along a linear guide 3. A linear measuring system, including a scale 4 and a scanning head 5, is used for determining the position of the carriage 2 in relation to the base 1.

In the represented example, the scale 4 is a metal tape, which is positively fastened between two guide strips 7, 7' of a scale guide device. On their underside the guide strips 7, 7' are provided with a foil 8, 8', which is provided with an adhesive on both sides.

So that in the course of the movement of the carriage 2 in relation to the bed 1 the scanning head 5 can continuously scan the graduation 4.1 of scale 4 in a contactless manner, the guide strips are fastened on the bed 1 so that they are aligned parallel with the displacement direction X of the scanning head 5, and therefore of the carriage 2.

Figure 3:
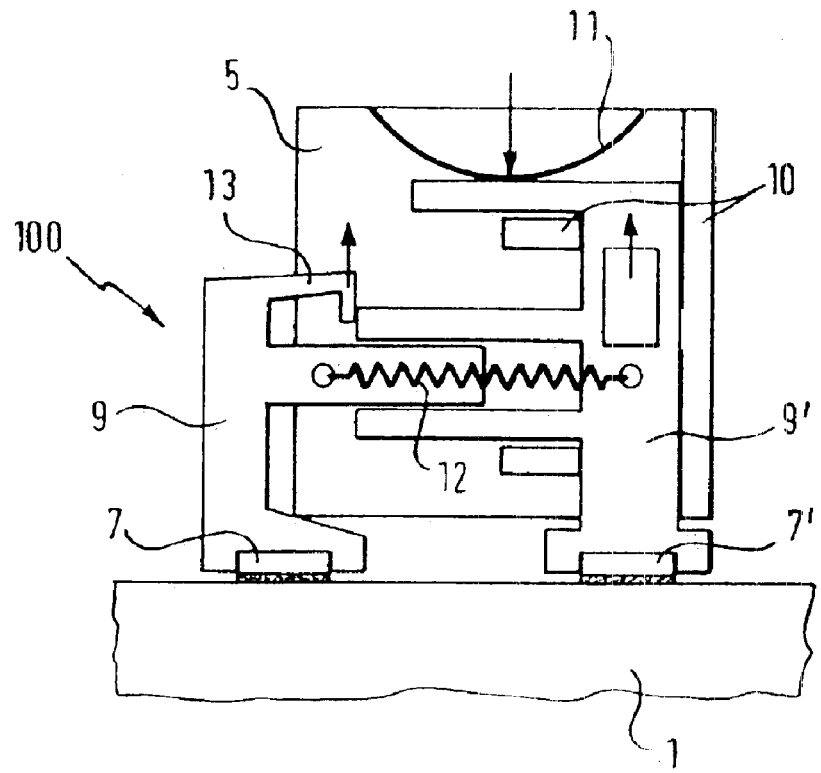
FIG. 3 represents the adjustment device of FIG. 1 in accordance with the present invention in its alignment position.
Figure 4:
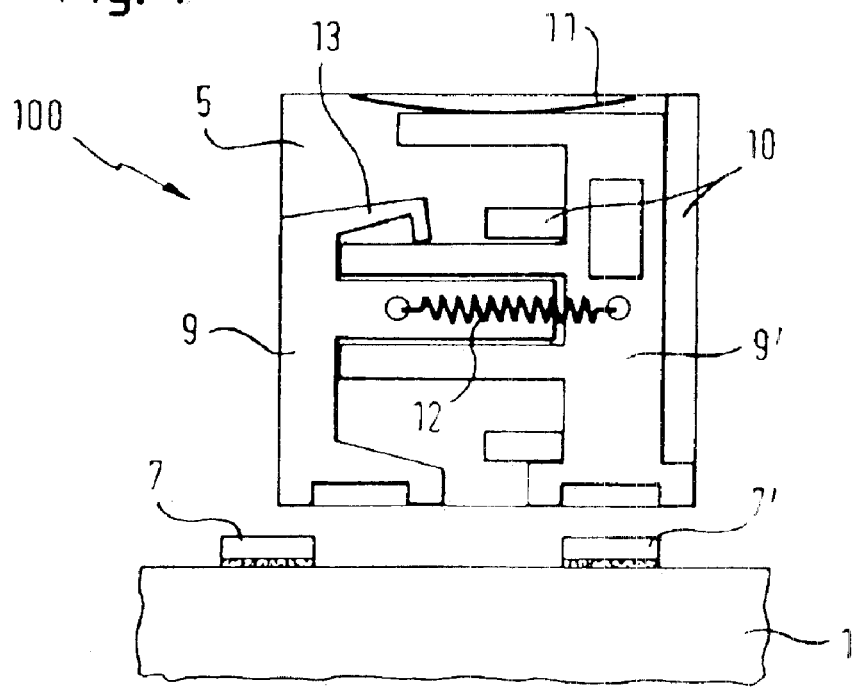
FIG. 4 represents the adjustment device of FIG. 1 in accordance with the invention in its position of rest.

In accordance with FIGS. 3 and 4, an adjustment device 100 in accordance with the present invention is provided on the scanning head 5.

Here, a first adjusting leg 9 is seated, displaceable with respect to a second adjusting leg 9', which in turn is furthermore seated displaceably with respect to the scanning head 5. The latter is arranged by a Z-guide 10. For aligning the scale guide device on the two guide strips 7, 7', the two adjusting legs 9, 9' can therefore be displaced into a position represented in FIG. 3, in which the adjusting legs 9, 9' extend free of play around the lateral edges of the two guide strips 7, 7'.

As stated, the scale 4 is provided with an adhesive foil 8 on its underside. In the course of the alignment process, a protective foil of this adhesive foil 8 is slowly pulled off the underside of the scale 4, and the aligned areas of the scale 4 are pushed onto the bed 1 and fixedly glued to the bed 1 by the adhesive foil 8. Pushing the scale 4 down can be performed manually or by a pusher device. Various embodiments of such pusher devices are known in the prior art.

Following the alignment, the two adjusting legs 9, 9' can be displaced into the position of rest represented in FIG. 4, in which they do not exceed the dimensions of the scanning head 5 and therefore have no interfering effect at all on the measuring operations. By displacing the adjusting legs 9, 9' into the position of rest, the scanning distance between the scale 4 and the scanning head 5, required for a measurement, also results.

In the represented embodiment of the adjustment device 100, the second adjusting leg 9' is prestressed into the alignment position by a leaf spring 11. A stop 13 keeps the first adjusting leg 9 in the alignment position (FIG. 3).

The transition from the alignment position (FIG. 3) into the position of rest (FIG. 4) takes place as follows: when the first adjusting leg 9 is pushed upward out of the alignment position in relation to the second adjusting leg 9', a helical spring 12 pulls the first adjusting leg 9 toward the right (in the drawing), so that the lateral distance between the adjusting legs 9, 9' is already reduced. Then both adjusting legs 9,9' are displaced against the force of the leaf spring 11 further upward, and therefore into the position of rest, in which they no longer exceed the dimension of the scanning head 5. The two adjusting legs 9, 9' are arrested in this position.

If now the scale guide device 7, 7' is again to be aligned, the arrestment of the adjusting legs 9, 9' in the position of rest (FIG. 4) is released, so that the adjusting legs 9, 9' are pushed downward by the leaf spring 11 in the direction toward the installation face 1.1 of the bed 1. The first adjusting leg 9 is then pulled outward until the stop 13 maintains it in the alignment position (FIG. 3).

The adhesive foil 8 can be provided alternatively or additionally on the installation face 1.1. Another adhesive layer can also be continuously or intermittently provided in place of the adhesive foil 8.

The described steps can of course also be used for aligning and mounting a scale support or a scale 4 itself. In this case the scale 4 can be a steel tape, a steel strip or a glass lamella.

Figure 5:
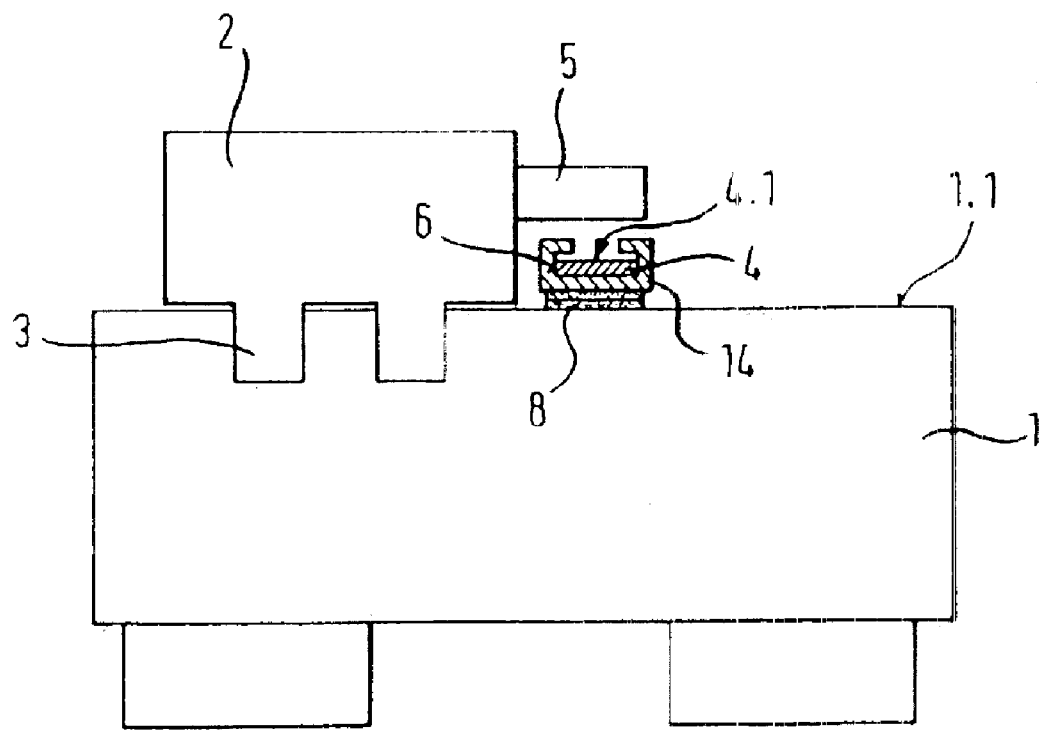
FIG. 5 represents a lateral view of a second embodiment of a coordinate-measuring machine with a second embodiment of an adjustment device in accordance with the present invention.

Such a scale support 14 is provided on the device represented in FIG. 5. A scale 4 has here been inserted into a groove 6 in the scale support 14.

So that in the course of the movement of the carriage 2 in relation to the bed 1 the scanning head 5 can continuously scan the graduation 4.1 of the scale 4 without touching it, the scale support 14 must be fastened, aligned parallel with the displacement direction of the scanning head 5, and therefore of the carriage 2. The alignment of the scale support 14 is performed by an adjusting device (not represented here), provided on the scanning head 5 in a way similar to FIGS. 3 and 4.

On its underside, the scale support 14 is provided with an adhesive foil 8 with glue on both side. The scale 4 itself can be already fastened to the scale support 14 in the course of the alignment, or it can be pushed into the groove 6 of the scale support 14 only after the latter has been glued in place.

Further exemplary embodiments exist within the scope of the present invention besides the described examples.

We claim:

1. A method for the directional attachment of a scale element of a position measuring system to an installation face of a first body, the method comprising:
    aligning a scale element on an installation face of a first body parallel to a measuring direction via an adjustment device provided on a second body, which has a scanning head provided thereon and wherein said second body, said scaning head and said adjusting device are movable in said measuring direction in relation to said first body;
    attaching said aligned scale element to said installation face, wherein said adjustment device is in an alignment position with respect to said second body during said attaching and cooperates with said scale element; and
    positioning said adjustment device into a position of rest with respect to said second body subsequent to said attaching, wherein said position of rest is different from said alignment position so that said adjustment device does not cooperate with said scale element at said position of rest.

2. The method in accordance with claim 1, wherein at said position of rest, said adjustment device remains on said second body.

3. The method in accordance with claim 1, wherein said adjustment device comprises an adjusting leg, which in said alignment position is displaced closer toward said first body than in said position of rest.

4. The method in accordance with claim 1, wherein said adjustment device is prestressed in either said alignment position or said position of rest.

5. The method in accordance with claim 1, wherein said adjustment device is provided on said scanning head.

6. A device for the directional attachment of a scale element of a position measuring system to an installation face of a first body, comprising:
    an adjustment device, which is provided on a second body that comprises a scanning head, which wherein said second body, said scanning head and said adjustment device are movable in a measuring direction in relation to a first body that includes an installation face, by which said adjustment device cooperates with a scale element, wherein said adjustment device causes said scale element to be aligned on said installation face parallel with respect to said measuring direction; and
    wherein said adjustment device is brought into an alignment position for aligning said scale element and, following attachment of said scale element, is moved into a position of rest with respect to said second body, which is different from said alignment position.

7. The device of claim 6, wherein said scale element comprises a scale.

8. The device of claim 6, wherein said scale element comprises a scale support.

9. The device of claim 6, wherein said scale element comprises a scale guide device.

10. The device in accordance with claim 6, wherein said adjustment device is integrated into said second body.

11. The device in accordance with claim 6, wherein said adjustment device comprises an adjusting leg for aligning said scale element, which is movable with respect to said second body.

12. The device in accordance with claim 6, wherein said adjustment device comprises a spring which prestresses said adjustment device in a direction of either said alignment position or said position of rest.

13. The device in accordance with claim 6, further comprising:
    a first adjusting leg;
    a second adjusting leg attached to said first adjusting leg, wherein said first and second adjusting legs are movably seated with respect to each other and with respect to said second body.

14. The device in accordance with claim 6, wherein said adjustment device is provided on said scanning head, which is a part of said second body, and that in said position of rest said adjustment device does not substantially increase the dimensions of said scanning head.

15. The device in accordance with claim 6, wherein at said position of rest said adjustment device does not cooperate with said scale element.

* * * * *